US012691718B2

(12) United States Patent
    Liu et al.

(10) Patent No.: US 12,691,718 B2
(45) Date of Patent: Jul. 28, 2026

(54) METHOD FOR CONTROLLING SUSPENSION SYSTEM, CONTROL SYSTEM, AND SUSPENSION CONTROL SYSTEM

(71) Applicant: Robert Bosch GmbH, Stuttgart (DE)

(72) Inventors: Jinyu Liu, Suzhou (CN); Renrui Wang, Suzhou (CN); Nan Sun, Suzhou (CN); Spark Li, Suzhou (CN)

(73) Assignee: Robert Bosch GmbH, Stuttgart (DE)

( * ) Notice: Subject to any disclaimer, the term of this patent is extended or adjusted under 35 U.S.C. 154(b) by 59 days.

(21) Appl. No.: 18/418,299

(22) Filed: Jan. 21, 2024

(65) Prior Publication Data

US 2024/0286450 A1     Aug. 29, 2024

(30) Foreign Application Priority Data

Feb. 27, 2023     (CN) ......................... 202310175221.1

(51) Int. Cl.
    *B60G 17/0195*     (2006.01)
    *B60G 17/016*     (2006.01)
    *B60G 17/018*     (2006.01)

(52) U.S. Cl.
    CPC ..... *B60G 17/0195* (2013.01); *B60G 17/0164* (2013.01); *B60G 17/018* (2013.01);
    (Continued)

(58) Field of Classification Search
    CPC ........... B60G 17/0195; B60G 17/0164; B60G 17/018; B60G 2400/106; B60G 2600/184; B60G 2800/22; B60G 2600/02; B60G 2600/70; B60G 2800/014; B60G 2400/39;

B60G 2400/82; B60G 2500/10; B60G 2500/30; B60G 17/015; B60G 17/0165; B60G 17/0182; B60G 2400/10; B60G 2400/20; B60T 8/171; B60T 8/18; B60T 8/245; B60T 8/32; B60T 2260/06;
(Continued)

(56) References Cited

U.S. PATENT DOCUMENTS 6,701,235 B2     3/2004   Uchiyama et al.
2015/0239523 A1*   8/2015   Ginther .................. B62K 25/04
                                                            701/1
(Continued)

FOREIGN PATENT DOCUMENTS

CN          101474953 B        6/2012
CN          110525401 A   * 12/2019   .......... B60T 8/17555
(Continued)

*Primary Examiner* — Joseph J Dallo
(74) *Attorney, Agent, or Firm* — Maginot, Moore & Beck LLP

(57)          ABSTRACT

A method for controlling a suspension system is disclosed. The method includes obtaining a first group of signals and a second group of signals; determining whether a trigger condition is met; determining an adjustment signal for adjusting the suspension system based on related signals of the suspension system, in response to the trigger condition being met; using the adjustment signal on the suspension system; the first group of signals being signals related to a comfort braking control system and the second group of signals being signals related to driving expectations. A system for controlling a suspension system and a suspension control system are also disclosed.

11 Claims, 6 Drawing Sheets

(52) U.S. Cl.
  CPC .. *B60G 2400/106* (2013.01); *B60G 2600/184*
           (2013.01); *B60G 2800/22* (2013.01)

(58) Field of Classification Search
  CPC . F16D 63/002; F16D 2121/32; B60R 16/037;
                      B60Y 2400/86
  See application file for complete search history.

(56)                    References Cited

U.S. PATENT DOCUMENTS

| | | | |
|---|---|---|---|
| 2016/0272033 A1 | 9/2016 | Nedachi et al. | |
| 2019/0256065 A1* | 8/2019 | Ono ..................... | B60T 8/1761 |
| 2021/0293575 A1* | 9/2021 | Arcos .................. | G07C 5/0841 |
| 2023/0406276 A1* | 12/2023 | Zhang .................. | B60T 13/662 |

FOREIGN PATENT DOCUMENTS

| | | | | |
|---|---|---|---|---|
| EP | 4292888 A1 * | 12/2023 | .............. | B60T 7/042 |
| JP | 2005-247068 A | 9/2005 | | |
| WO | WO-2015027916 A1 * | 3/2015 | .............. | B62D 5/062 |
| WO | WO-2023102731 A1 * | 6/2023 | ................ | B60T 8/00 |

* cited by examiner

METHOD FOR CONTROLLING SUSPENSION SYSTEM, CONTROL SYSTEM, AND SUSPENSION CONTROL SYSTEM

This application claims priority under 35 U.S.C. § 119 to patent application no. CN 2023 1017 5221.1, filed on Feb. 27, 2023 in China, the disclosure of which is incorporated herein by reference in its entirety.

The present disclosure relates to a vehicle-related technology, and more particularly, to a technology for controlling suspension systems.

BACKGROUND

Frequent "vehicle pitch" hesitations in the braking process of vehicles are one of the important factors affecting the comfort of a ride 10. Particularly, the different experience and style of drivers combined with differences in vehicle suspension control systems cause most drivers to experience a more pronounced "vehicle pitch" phenomenon when they brake the vehicle.

CST (Comfort Stop) system, i.e., comfort braking control system, is thus introduced into vehicles to alleviate the driving discomfort caused by "vehicle pitch".

SUMMARY

According to one aspect of the present disclosure, a method for controlling a suspension system is provided, the method comprising obtaining a first group of signals and a second group of signals; determining whether a trigger condition is met based on the first group of signals and the second group of signals; determining an adjustment signal for adjusting the suspension system based on related signals of the suspension system, in response to the trigger condition being met; the suspension system controlling the suspension based on the adjustment signal; the first group of signals being signals related to a comfort braking control system and the second group of signals being signals related to driving expectations.

According to the method for controlling a suspension system of the present disclosure, in some examples, the first group of signals comprises a status signal indicating the status of the comfort braking control system, an actual acceleration signal indicating the actual acceleration of the vehicle, and a target acceleration signal indicating the target acceleration.

According to the method for controlling a suspension system of the present disclosure, in some examples, the second group of signals comprises a signal indicating the brake pressure size requested by the driver, a signal indicating the speed at which the driver is stepping on the brake foot pedal, and a signal indicating the road slope.

The method for controlling a suspension system of the present disclosure, in some examples, determining whether a trigger condition is met comprises: determining whether a vehicle begins braking comfortably based on the first group of signals and the second group of signals; obtaining a first parameter from a first parameter table according to the actual acceleration signal of the vehicle, in response to the determination result that the vehicle has begun braking comfortably; setting a timing value for a timer according to the first parameter; obtaining a second parameter from a second parameter table according to a road slope signal; modifying the timing value according to the second parameter; the trigger condition being met once the timer starts timing and the timing is up.

According to the method for controlling a suspension system of the present disclosure, in some examples, relevant signals of the suspension system comprise a signal related to suspension stiffness, a signal related to suspension damping, and a signal related to suspension height, the adjustment signal being a signal indicating a target damping force.

According to yet another aspect of the present disclosure, a controller for a suspension system is provided, the controller comprising a processor and memory for storing instructions, the processor being configured to implement the control method described above when the instructions are executed.

According to yet another aspect of the present disclosure, a system for controlling a suspension system is provided, the control system comprising a receiving module for receiving a first group of signals and a second group of signals; a processing module for determining whether a trigger condition is met based on the first group of signals and the second group of signals; an adjustment signal determined for adjusting the suspension system based on relevant signals of the suspension system, in response to the trigger condition being met; an output module for outputting the adjustment signal to the suspension system; the first group of signals are signals related to the comfort braking control system and the second group of signals are signals related to driving expectations.

According to the system for controlling a suspension system of the present disclosure, in some examples, the processing module is set to comprise a trigger unit and a processing unit, the trigger unit being set to determine whether a vehicle begins braking comfortably based on the first group of signals and the second group of signals; obtain a first parameter from a first parameter table according to the actual acceleration signal of the vehicle, wherein the actual acceleration signal is from the first group of signals, in response to the determination result that the vehicle has begun braking comfortably; set a timing value for a timer according to the first parameter; obtain a second parameter from a second parameter table according to a road slope signal, wherein the road slope signal is from the second group of signals; modify the timing value according to the second parameter; generate a trigger signal and send it to the processing unit when the trigger condition is met, i.e., once the timer starts timing and the timing is up; the processing unit is set as an adjustment signal for adjusting the suspension system determined based on related signals of the suspension system.

According to a further aspect of the present disclosure, a suspension control system is provided, the suspension control system comprising a processor connected to a comfort braking control system and a suspension control actuator, the processor when executing instructions stored in the memory, being configured to obtain a first group of signals related to the comfort braking control system; obtain a second group of signals related to driving expectations; determine whether a trigger condition is met based on the first group of signals and second group of signals; determine an adjustment signal for adjusting the suspension system based on related signals of the suspension system, in response to the trigger condition being met; send the adjustment signal to the suspension control actuator; the first group of signals being from the comfort braking control system and the second group of signals being from related parts.

According to the suspension control system of the present disclosure, the processor is configured to implement the following process when executing instructions to determine if a trigger condition is met: determining whether a vehicle begins braking comfortably based on the first group of signals and the second group of signals; obtaining a first parameter from a first parameter table according to the actual acceleration signal of the vehicle, wherein the actual acceleration signal is from the first group of signals, in response to the determination result that the vehicle has begun braking comfortably; setting a timing value for a timer according to the first parameter; obtaining a second parameter from a second parameter table according to a road slope signal, wherein the road slope signal is from the second group of signals; modifying the timing value according to the second parameter; the trigger condition being met once the timer's timing is up.

A vehicle is further provided, the vehicle being configured to be capable of performing the method for controlling a suspension system as described above, comprise a system for controlling a suspension system as described above, or comprise a suspension control system as described above.

BRIEF DESCRIPTION OF THE DRAWINGS

The present disclosure will be more fully understood by referring to the detailed description of the specific embodiments below in conjunction with the drawings, in which like reference numerals in the drawings always refer to like elements in the view. Wherein.

DETAILED DESCRIPTION

To help those skilled in the art accurately understand the subject matter claimed in the present application, the specific embodiments of the present disclosure will be described in detail below in conjunction with the drawings.

Figure 1:
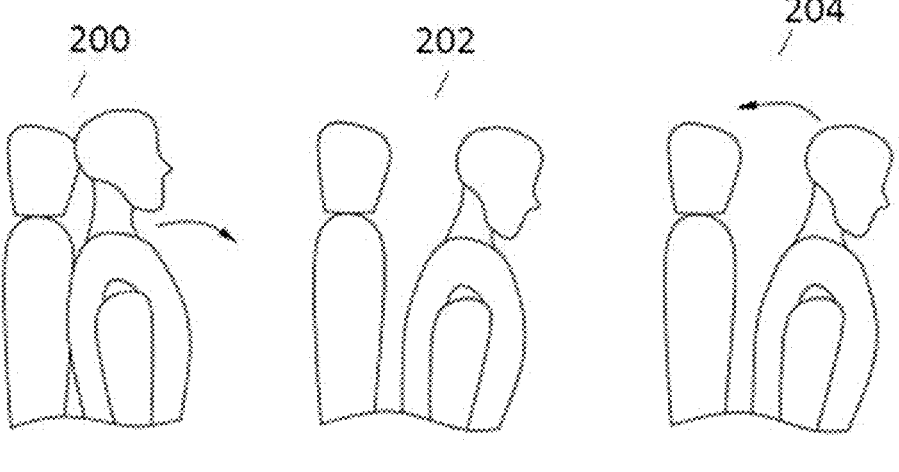
FIG. 1 illustrates changes in the status of a driver and passenger during the braking of a vehicle.

FIG. 1 illustrates changes in the status of a driver and a passenger during the braking process of a vehicle, wherein the vehicle uses a semi-active suspension of a Skyhook damping shock-absorbing control strategy and the vehicle comprises a CST system. The driver and passenger referred to herein refer to either or both of a driver and a passenger. In the example of FIG. 1, the first stage 200 is the process where pitch of the vehicle where the driver and passenger are in starts, the second stage 202 is an illustration of a driver and a passenger leaning forward due to inertia when the limit of vehicle pitch is reached and the vehicle shifts backwards, and the third stage 204 is an illustration of a driver and a passenger beginning to revert to the original state.

Figure 2:
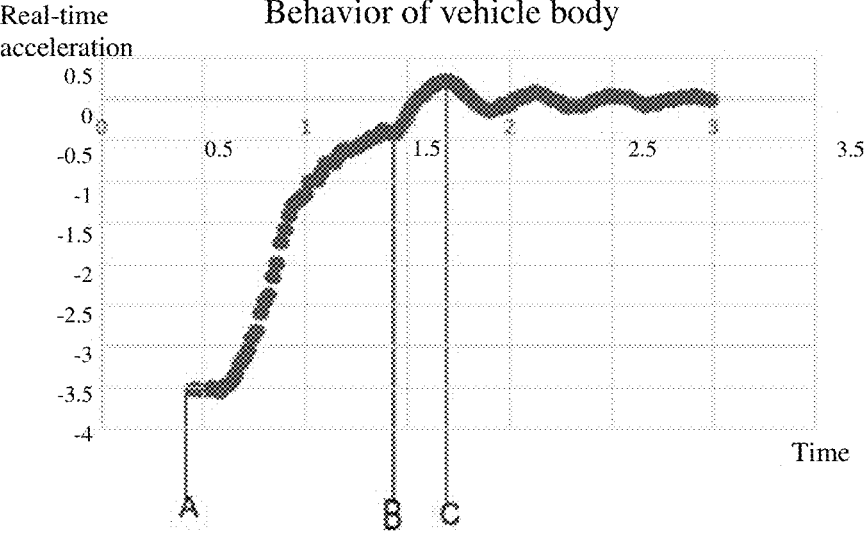
FIG. 2 is a plot of changes corresponding to acceleration output by the CST system during the braking of the vehicle shown in FIG. 1.
Figure 3:
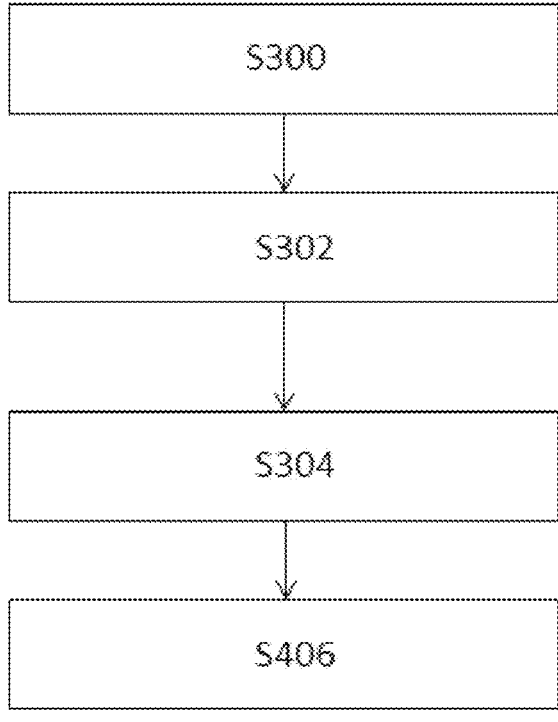
FIG. 3 is a flow chart of a suspension control method for a vehicle using a CST (Comfort Stop) system according to some examples of the present disclosure.

FIG. 2 is a plot of changes corresponding to acceleration output of the CST system during the braking of the vehicle shown in FIG. 1, wherein the horizontal axis indicates time and the vertical axis indicates vehicle acceleration. As shown in FIG. 3, the intersection point B of the AB portion and the BC portion of the curve is the starting point for the compressed suspension to begin further compression and is also the point at which the vehicle enters the stationary state. After point B, the driver and passenger begin to lean forward, for example, as shown in the second stage 202 and lean backwards as shown in the third stage 204 of FIG. 2.

FIG. 3 is a flow chart of a suspension control method for a vehicle using a CST (Comfort Stop) system according to some examples of the present disclosure. As shown, in step S300, a first group of signals and a second group of signals are obtained. The first group of signals and the second group of signals are obtained from related parts (for example, related sensor) or systems of the vehicle, wherein the first group of signals are signals related to the comfort braking control system CST and the second group of signals are signals related to driving expectations.

In the examples of the present disclosure, signals related to the comfort braking control system CST refers to signals output by the CST controller, for example, comprising a status signal indicating the status of the CST, an actual acceleration signal indicating the actual acceleration of the vehicle, and a target acceleration signal indicating the target acceleration. In the following examples, by way of example and not limitation, the first group of signals comprises a status signal indicating the CST status, an actual acceleration signal indicating the actual acceleration of the vehicle, and a target acceleration signal indicating the target acceleration. Alternatively, the first group of signals may also use signals indicating the actual vehicle speed and the target vehicle speed, signals indicating the actual brake pressure and the target brake pressure, and the like.

In the examples of the present disclosure, signals related to driving expectations refer to signals used to determine a driver's braking intent with respect to a vehicle. For example, signals indicating the driver's requested brake pressure size, signals indicating the speed at which the driver is stepping on the brake foot pedal, and signals indicating the road slope, all of which may be obtained from vehicle-related systems and/or parts (such as the brake system).

In step S302, whether the trigger condition is met is determined based on the first group of signals and the second group of signals. The trigger condition referred to herein refers to a condition used to determine an adjustment signal for adjusting the current suspension system, and is described further below in conjunction with FIG. 4. In step S304, an adjustment signal for adjusting the vehicle suspension is determined based on related signals of the vehicle suspension system, in response to the trigger condition being met.

According to some examples of the present disclosure, related signals of the suspension system comprise a signal related to suspension stiffness, a signal related to suspension damping, and a signal related to suspension height. A signal related to suspension stiffness, for example, is a current signal indicating suspension stiffness sent by a suspension stiffness controller; a signal related to suspension damping, for example, is a current signal indicating damping size sent by a damping controller; a signal related to current suspension height, for example, is a signal indicating the difference between the sprung height displacement of the suspension and unsprung height displacement of the suspension. According to an example of the present disclosure, the adjustment signal is a signal that indicates the target damping force. In other words, the adjustment target is the damping force of the suspension. The target damping force for adjusting the damping force of the suspension is determined based on a signal related to suspension stiffness, a signal related to suspension damping, and a signal related to suspension height.

Figure 5:
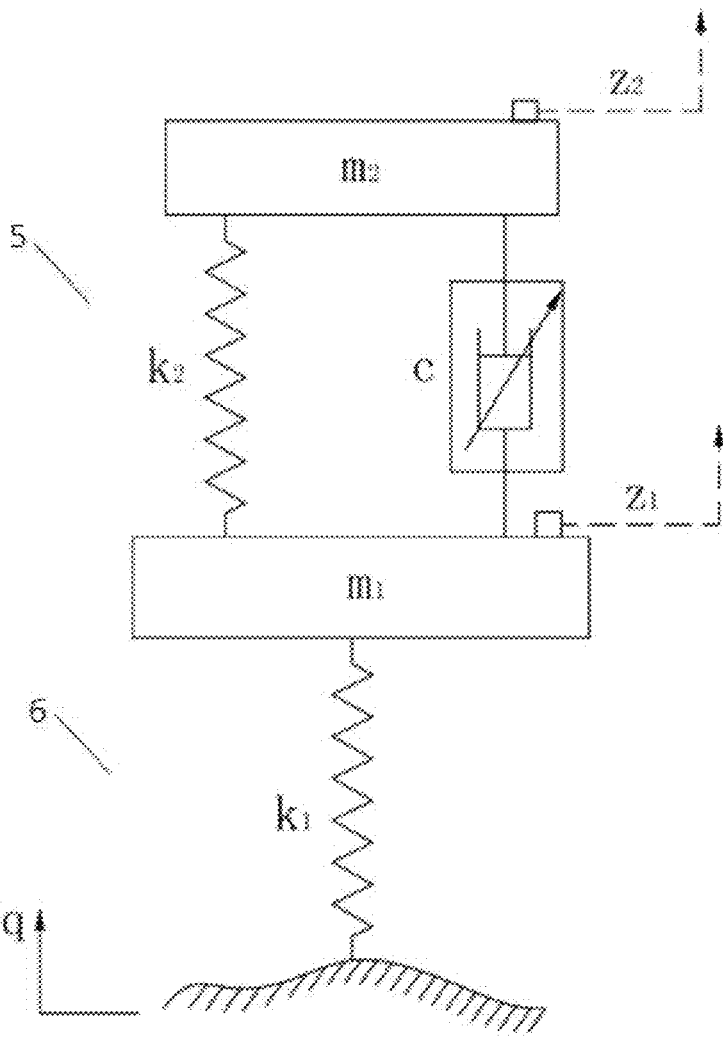
FIG. 5 is a simplified equivalent chart of a semi-active suspension using a Skyhook damping shock-absorbing control strategy.

Taking a semi-active suspension using a Skyhook damping shock-absorbing control strategy as an example of a vehicle suspension, the adjustment signal may be determined according to a system of equations (1) in step 304. To better illustrate the system of equations (1), a simplified equivalent chart of a semi-active suspension using a Skyhook damping shock-absorbing control strategy is illustrated in FIG. 5. As shown in FIG. 5, a suspension 5 is simplified to comprise a sprung mass portion with a value of $m_2$, a stiff spring portion with a stiffness value of $k_2$, a damping portion with a damping value of c, and a unsprung mass portion with a value of $m_1$. A tire 6 is simplified as a tire portion 6 having a stiffness value of $k_1$. In addition, $z_1$ is an unsprung height value, $z_2$ is a sprung height value, and $z_2$–$z_1$ is a suspension compression value.

In the system of equations (1):

$$m_2 \ddot{z}_2 + c(\dot{z}_2 \cdot \dot{z}_1) + k_2(z_2 - z_1) + F_{\_Suspension} = 0 \qquad (1)$$

$$m_1 \ddot{z}_1 - c(\dot{z}_2 \cdot \dot{z}_1) + k_2(z_2 - z_1) + k_1(z_1 - q) = F_{\_Suspension}$$

$$F_{\_Suspension} = -c \cdot \dot{z}_2$$

wherein $m_2$ is the sprung mass, c is the damping value, $k_1$ is the stiffness value of the tire, $k_2$ is the stiffness value of the spring, $m_1$ is the unsprung mass, $z_1$ is the unsprung height value, $z_2$ is the sprung height value, $z_2$–$z_1$ is the suspension compression value, $k_2(z_2$–$z_1)$ is the rebound force of the suspension spring, Suspension is the target damping force to be calculated, $Z_2$–$Z_1$ is the speed of suspension extension, $c(Z_2$–$Z_1)$ is the suspension damping force, $m_2 \ddot{z}$ is equivalent to ma, i.e., the vertical force of the vehicle body obtained from multiplying the vehicle mass m by the vertical acceleration a of the vehicle body, $k_1(z_1$–q) is the rebound force of the tire.

It must be noted that c, used as damping value in the system of equations (1), is selected among maximum damping value $c_{max}$ and conventional value $c_{normal\ mode}$, as shown in equation (2). Specifically, according to the examples of the present disclosure, when the trigger condition is met, $c_{max}$ is selected for c when the target damping force is calculated according to the system of equations (1); but when the trigger condition is not met and when the target damping force is calculated according to the system of equations (1), conventional value $c_{normal\ mode}$ is selected for c.

Equation (2) is as follows:

$$c = \begin{cases} c_{max} \\ c_{normal\ mode} \end{cases} \qquad (2)$$

Damping force is used in the present disclosure as a control target for adjusting the suspension, but control targets such as spring stiffness, suspension height, and the like may also be used for adjusting the suspension. In other words, the adjustment signal may be a signal indicating a target damping force in an example of the present disclosure, but may also comprise or be a signal indicating target stiffness, a signal indicating target height, or the like.

Returning to FIG. 3, in step S306, the suspension system controls the suspension based on the adjustment signal, i.e., the calculated adjustment signal is used by the suspension system (for example, the actuator of the suspension system) to adjust the suspension, so as to buffer the force generated by the compressed suspension returning to the original position thereof.

The suspension is controlled by an actuator of the suspension system according to, for example, a target damping force F_Suspension determined according to the system of equation (1), so as to buffer the force generated when the compressed suspension returns to the original position thereof.

Figure 4:
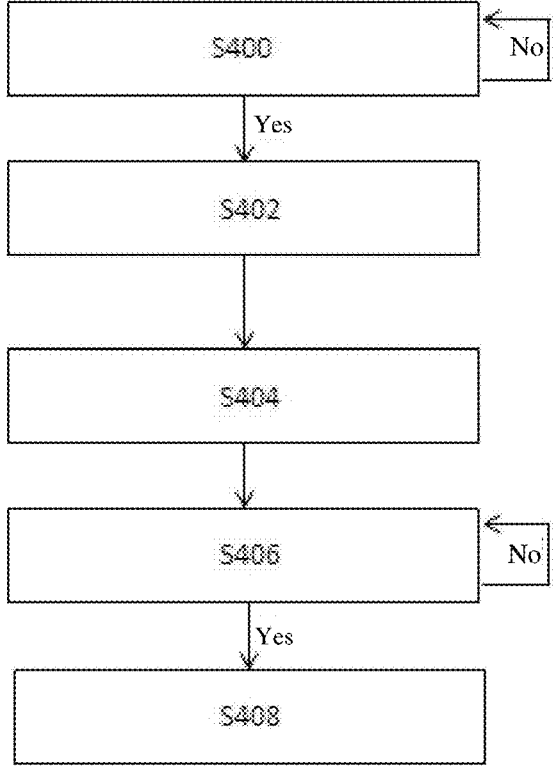
FIG. 4 is a flow chart of a method for determining if a trigger condition is met according to an example of the present disclosure.

FIG. 4 is a flow chart of a method for determining whether a trigger condition is met according to an example of the present disclosure, i.e., a flow chart of the specific example of step S302 in FIG. 3. As shown in FIG. 4, in step S400, whether a vehicle begins braking comfortably is determined based on the first group of signals and the second group of signals, i.e., whether the vehicle begins braking comfortably is determined based on a CST status signal output by the CST controller, an actual acceleration signal, a target acceleration signal, and a signal of the driver's intent to brake the vehicle.

Where it is determined that the vehicle is about to begin braking comfortably, proceed to step S402, otherwise proceed to step S400. In step S402, a first parameter is obtained from a first parameter table according to the actual acceleration signal output by the CST controller and a timing value for the timer is set according to the first parameter. In step S404, a second parameter is obtained from a second parameter table according to a slope signal of the road the vehicle is driving on, and the timing value of the timer is modified according to the second parameter. In step S406, whether timing by the timer is up is determined. If timing is up, the trigger condition is met, as shown in step S408.

The specific example of step S406 is, for example, determines whether the timer counts down to zero. If the timer counts down to zero, the trigger condition is met. If the timing is not up, proceed to step S406.

Here, a first mapping table maps the relationship between acceleration and time from the start of the vehicle braking comfortably to the time when the vehicle is stationary. A second mapping table maps the relationship between the slope of the road and the duration of vehicle braking from the start of the vehicle braking comfortably to the time when the vehicle is stationary. The first and second mapping tables may be pre-set based on pre-testing and/or experience and may be continuously updated after the vehicle starts to be driven, as appropriate. In the present disclosure, the term "braking comfortably" refers to the braking process of a vehicle using the CST system.

Point A, shown in FIG. 2, is the starting point for the increase in vehicle acceleration, and is the point at which the timer starts timing in step S406 of FIG. 4.

It can be seen that the method for controlling a suspension system according to the example of the present disclosure, determines whether a moving vehicle starts to brake comfortably based on the comfort braking control system and real-time data of related systems, and if it is determined that the vehicle has begun braking comfortably, i.e. related signals, such as target damping force of the vehicle suspension control system are combined in real-time to calculate the adjustment signal for controlling (may also be referred to as adjusting with respect to conventional suspension control) the work of the suspension system, the calculated adjustment signal is applied in real time to a suspension control system, for example, an actuator, such that the suspension is capable of working in a gentler manner during braking.

Figure 6:
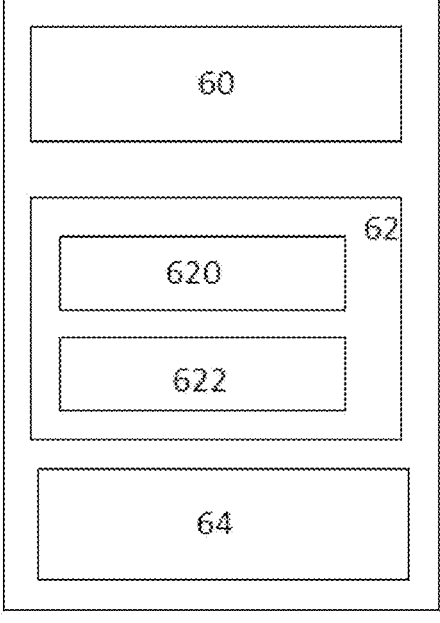
FIG. 6 is a structural schematic diagram of a control system for a suspension system according to some examples of the present disclosure.

FIG. 6 is a structural schematic diagram of a control system that may be applied to a suspension system of a vehicle according to some examples of the present disclosure. As shown in FIG. 6, the control system comprises a receiving module 60, a processing module 62, and an output module 64. The receiving module 60 is used to receive a first group of signals and a second group of signals. The processing module 62 is used to determine whether a trigger condition is met based on the first group of signals and the second group of signals, and, to determine an adjustment signal for adjusting the suspension system based on related signals of the suspension system, in response to the trigger condition being met. The output module 64 is used to output the adjustment signal.

The first group of signals and second group of signals have been described above. Hence, none of the following examples will be repeated herein. The receiving module 60 receives a first group of signals from the CST system, and more particularly, from a controller of the CST system, comprising a signal indicating the status of the CST, an actual acceleration signal indicating the actual acceleration of the vehicle, and a target acceleration signal indicating the target acceleration. The receiving module 60 receives a signal from a vehicle-related system and/or part that may be used to determine driving intent, i.e., a second group of signals, and the related system may be a vehicle brake system or a part thereof, and may also be a controller of a CST, and the like. For example, a signal indicating the brake pressure size requested by the driver, a signal indicating the speed at which the driver is stepping on the brake foot pedal, and a signal indicating the road slope obtained from the brake system of the vehicle.

The processing module 62 may comprise a trigger unit 620 and a processing unit 622. The trigger unit 620 is configured to perform the process described above in conjunction with FIG. 4 and to trigger the processing unit 622 when the trigger condition is met, such that the processing unit 622 determines the adjustment signal for adjusting the suspension system based on related signals of the suspension system. Related signals of the suspension system comprise a signal related to suspension stiffness, a signal related to suspension damping, and a signal related to suspension height, which are input to the processing unit 622 in order to determine the adjustment signal based on the parameter values that they each indicate. The adjustment signal herein is a signal indicating the target damping force. The processing unit 622 is configured to be capable of performing the above determination of the adjustment signal in conjunction with the step S304 of FIG. 3. Hence, it will not be repeated herein.

The system for controlling a suspension system shown in FIG. 6 may be used to perform the above-described method for controlling a suspension system in conjunction with the drawings. Hence, the specific process will not be repeated herein.

The system shown in FIG. 6 may be implemented as hardware, software, or a combination of software and hardware. For example, when implemented in software, the modules may be implemented as software modules. The system as shown in FIG. 6 may be applied to the vehicle as a standalone system and be communicatively connected to the suspension system and CST system to connect with other related systems and parts of the vehicle as desired. Alternatively, the system as shown in FIG. 6 is implemented directly in an existing system of the vehicle, such as in software for implementation in a CST system controller.

Figure 7:
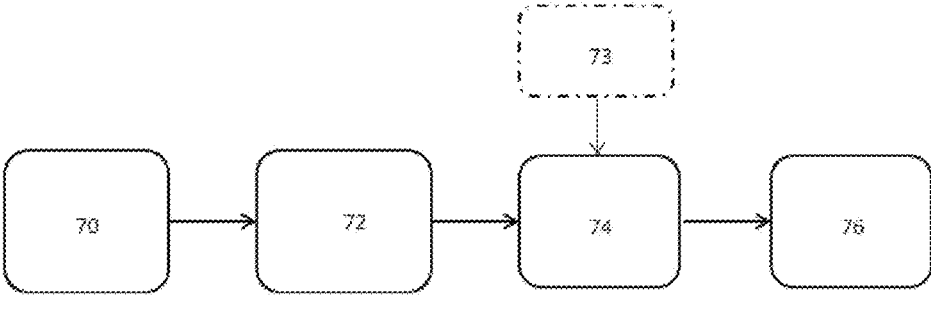
FIG. 7 is a structural schematic diagram of a suspension control system according to an example of the present disclosure.

FIG. 7 is a structural schematic diagram of a suspension control system according to some examples of the present disclosure. The suspension control system comprises a processor 74 connected to a comfort brake CST system controller 72 and a suspension control actuator 76. The processor 74 may obtain instructions from a memory 73. The memory 73 may be disposed outside of the processor 74 to exist as a standalone part; or the memory 73 may be memory already in the vehicle (such as a memory of the CST system or the suspension system); or the memory may be a storage part disposed within the processor 74. The memory is indicated in the figure by a dashed box 73 and is illustrated as being disposed outside of the processor 74, but may be implemented as one or a combination of the above-described dispositions. The processor 74 may obtain instructions from the memory 73 and execute them. When the processor 74 executes this instruction, the processor obtains a first group of signals related to the comfort braking control system from the CST system controller 72 and a second group of signals related to driving expectations from other related parts, such as the controller 70 of the vehicle brake system; the processor 74 determines whether the trigger condition is met based on these signals; and determines an adjustment signal for adjusting the vehicle suspension based on related signals of the vehicle suspension system from the suspension control system, in response to the trigger condition being met, and sends the determined adjustment signal to the suspension control actuator 76 for adjusting the suspension based on this.

The processor 74, when executing the instructions, determines whether the trigger condition is met based on the following process implementations: determining whether a vehicle begins braking comfortably based on the first group of signals and the second group of signals; obtaining an actual acceleration signal from the CST controller 72, in response to the determination result that the vehicle has begun braking comfortably; obtaining a first parameter from a first parameter table; setting a timing value for a timer according to the first parameter; obtaining a road slope signal from. for example, a controller 70 of the vehicle brake system and obtaining a second parameter from a second parameter table; modifying the timing value according to the second parameter; determining that the trigger condition is met once the timer's timing is up.

The suspension control system shown in FIG. 7, which may perform the method for controlling a suspension system described in conjunction with FIGS. 3-5.

Referring to FIGS. 7 and 3 concurrently, the processor 74 obtains a first group of signals from the comfort braking control system controller 72 and a related system and/or part of the vehicle obtains a second group of signals (step S300). The processor 74 determines whether the trigger condition is met based on the first group of signals and the second group of signals (step S302). The processor 74 performs the method for determining if a trigger condition is met as shown in FIG. 4 to determine if the trigger condition is met. The processor 74 determines an adjustment signal for adjusting the suspension system based on related signals of the suspension system if the trigger condition is met (step S304). The processor 74 sends the determined adjustment signal to the suspension system actuator 76 so as to adjust the suspension system accordingly (step S306).

The suspension system shown in FIG. 7, wherein the processor 74 is a separate part, may also be implemented in the CST system, such as in the CST controller 72, or in the suspension control system, such as in the actuator 76 of the suspension control system.

Whether a vehicle is about to brake comfortably may be determined by performing an example of the suspension control method of the present disclosure, using an example of the system for controlling a suspension system of the present disclosure, or using an example of the suspension control system of the present disclosure example. This determination is based on existing signals of the vehicle's CST controller, such as a signal of CST status, vehicle acceleration signal, and the like, and takes into account a signal indicating driving intention that is collected by existing related systems and/or parts of the vehicle (for example, a signal related to the driver's stepping of the brake that is collected from the brake system). This triggers the calculation of a target control signal (specific examples of the present disclosure use target damping force) on the suspension accordingly. Changes in suspension damping force are modified in real time based on this such that the compression of the suspension becomes gentler in the recovery process from the braking to stopping of the vehicle, effectively preventing the occurrence of vehicle pitch phenomenon.

Figure 8:
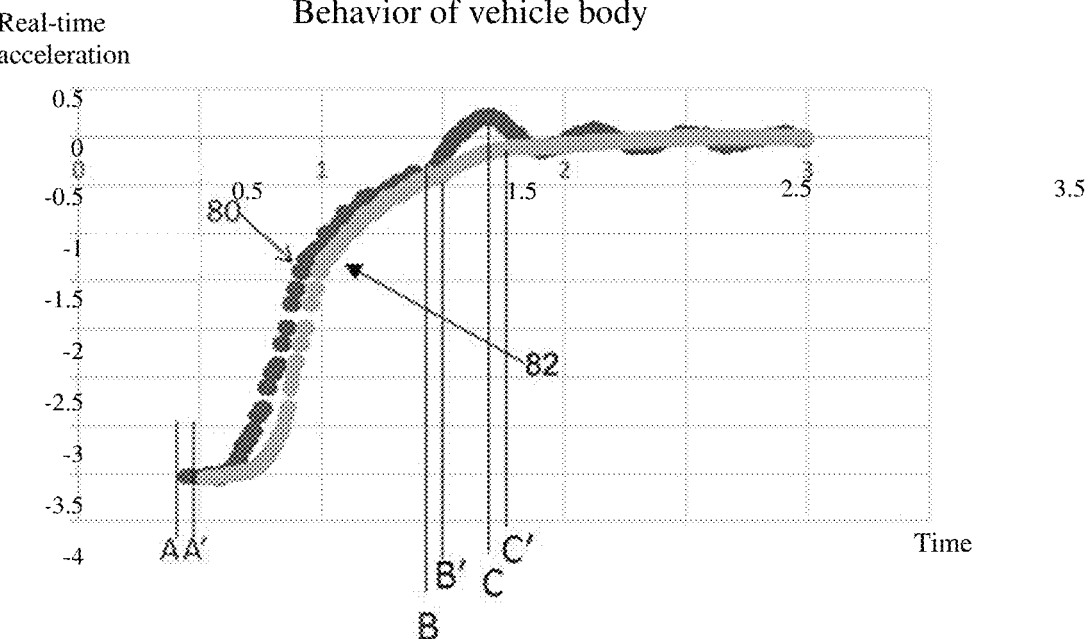
FIG. 8 is a plot of changes of acceleration output by the CST system during the braking of a vehicle before and after an example of a suspension control method of the present disclosure is performed, or an example of a system for controlling a suspension system or an example of a suspension control system of the present disclosure is used.

FIG. 8 is a plot of changes of acceleration output by the CST system during the braking of a vehicle, before and after an example of the suspension control method of the present disclosure is performed, or an example of the system for controlling a suspension system is used, or an example of a suspension control system of the present disclosure is used. The curve 80 shown in FIG. 8 is the curve shown in FIG. 2, and is a plot of changes of acceleration output by the CST system during the braking of a vehicle before a scheme according to examples of the present disclosure is adopted. The curve 82 is a plot of changes of acceleration output by the CST system during the braking of a vehicle after schemes according to examples of the present disclosure are adopted, i.e., an example of the suspension control method of the present disclosure is performed, or an example of the system for controlling a suspension system of the present disclosure is used, or an example of a suspension control system of the present disclosure is used, and is also a plot of desired and targeted changes of acceleration. It must be noted that for ease of view, the curve 82 is translated slightly to the right here, and in fact, point A of the curve 80 is supposed to be the same point as point A' of the curve 82, while the rest of the curve 82 is generally overlaid with the curve 80, except for the portions that differ from curve 80 after being adjusted to be gentler. As shown in FIG. 8, it can be seen that the BC segment of the curve 80 has been transformed into the B'C' segment of the curve 82, which is gentler.

The present disclosure also provides a controller for a suspension system comprising a processor and memory for storing instructions, the processor being configured to implement the control methods described above when executing the instructions. The controller may be incorporated into an existing suspension control system.

The present disclosure further provides a vehicle performing the method for controlling a suspension system as described above, or a vehicle using a system for controlling the suspension system as described above, or a vehicle using a suspension control system as described above.

The suspension mentioned in the above examples of the present disclosure are semi-active suspensions of a Skyhook damping shock-absorbing control strategy, but the methods and systems of the examples of the present disclosure are also applicable to other types of semi-active suspensions, such as suspensions using continuous damping control (CDC) systems and suspensions using magnetorheological dampers (MRD).

While specific examples of the present disclosure have been shown and described in detail to illustrate the principles of the present disclosure, it will be appreciated that the present disclosure may be implemented in other ways without departing from such principles.

What is claimed is:

1. A method for controlling a suspension system of a vehicle, comprising:
   obtaining a first group of signals, the first group of signals being signals that are output by a controller of a braking control system of the vehicle, the braking control system being configured to reduce vehicle pitch when bringing the vehicle to a stop, the first group of signals including at least one of (i) a status signal indicating a status of the braking control system, (ii) an actual acceleration signal indicating an actual acceleration of the vehicle, and (iii) a target acceleration signal indicating a target acceleration;
   obtaining a second group of signals, the second group of signals including at least one of (i) a signal indicating a brake pressure size requested by a driver of the vehicle, (ii) a signal indicating a speed at which the driver is stepping on a brake foot pedal, and (iii) a signal indicating a road slope;
   determining whether a trigger condition is met based on the first group of signals and the second group of signals, the determining whether the trigger condition is met including determining whether the vehicle begins braking based on the first group of signals and the second group of signals;
   determining an adjustment signal for adjusting the suspension system based on signals defining at least one characteristic of the suspension system, in response to the trigger condition being met; and
   adjusting the suspension system using the adjustment signal.

2. The method according to claim 1, wherein the first group of signals include all of the status signal indicating the status of the braking control system, the actual acceleration signal indicating the actual acceleration of the vehicle, and the target acceleration signal indicating the target acceleration.

3. The method according to claim 1, wherein the second group of signals include all of the signal indicating the brake pressure size requested by the driver, the signal indicating the speed at which the driver is stepping on the brake foot pedal, and the signal indicating the road slope.

4. The method according to claim 3, wherein the determining whether the trigger condition is met further comprises:
   obtaining a first parameter from a first parameter table according to an actual acceleration signal, in response to the vehicle beginning to brake;
   setting a timing value for a timer according to the first parameter;
   obtaining a second parameter from a second parameter table according to a road slope signal; and modifying the timing value according to the second parameter, wherein the trigger condition is met once the timer starts timing and the timing is up.

5. The method according to claim 1, wherein the signals defining the at least one characteristic of the suspension system comprise a signal defining a suspension stiffness, a signal defining a suspension damping, and a signal defining a suspension height, the adjustment signal being a signal indicating a target damping force.

6. A controller for the suspension system, comprising a processor and a memory for storing instructions, the processor being configured to implement the method according to claim 1 when executing the instructions.

7. A system for controlling a suspension system of a vehicle, comprising:

a receiving module configured to (i) receive for receiving a first group of signals, the first group of signals being signals that are output by a controller of a braking control system of the vehicle, the braking control system being configured to reduce vehicle pitch when bringing the vehicle to a stop, the first group of signals including at least one of a status signal indicating a status of the braking control system, an actual acceleration signal indicating an actual acceleration of the vehicle, and a target acceleration signal indicating a target acceleration, and (ii) receive a second group of signals, the second group of signals including at least one of a signal indicating a brake pressure size requested by a driver of the vehicle, a signal indicating a speed at which the driver is stepping on a brake foot pedal, and a signal indicating a road slope;

a processing module configured to (i) determine whether a trigger condition is met based on the first group of signals and the second group of signals, including determining whether the vehicle begins braking based on the first group of signals and the second group of signals, and (ii) determine an adjustment signal for adjusting the suspension system based on signals defining at least one characteristic of the suspension system, in response to the trigger condition being met; and an output module configured to adjust the suspension system using the adjustment signal.

8. The system according to claim 7, wherein the processing module is disposed to comprise a trigger unit and a processing unit, the trigger unit being set to:

obtain a first parameter from a first parameter table according to an actual acceleration signal of the vehicle, wherein the actual acceleration signal is from the first group of signals, in response to a determination result that the vehicle has begun braking;

set a timing value for a timer according to the first parameter;

obtain a second parameter from a second parameter table according to a road slope signal, wherein the road slope signal is from the second group of signals;

modify the timing value according to the second parameter;

determine that the trigger condition is met once the timer starts timing and the timing is up, thereby triggering the processing unit; and set the processing unit to determine the adjustment signal for adjusting the suspension system based on the signals defining the at least one characteristic of the suspension system.

9. A suspension control system of a vehicle, comprising:

a processor connected to a braking control system and a suspension control actuator, the processor when executing instructions stored in a memory, being configured to:

obtain a first group of signals, the first group of signals being signals that are output by a controller of the braking control system, the braking control system being configured to reduce vehicle pitch when bringing the vehicle to a stop, the first group of signals including at least one of (i) a status signal indicating a status of the braking control system, (ii) an actual acceleration signal indicating an actual acceleration of the vehicle, and (iii) a target acceleration signal indicating a target acceleration;

obtain a second group of signals, the second group of signals including at least one of (i) a signal indicating a brake pressure size requested by a driver of the vehicle, (ii) a signal indicating a speed at which the driver is stepping on a brake foot pedal, and (iii) a signal indicating a road slope;

determine whether a trigger condition is met based on the first group of signals and the second group of signals, including determining whether the vehicle begins braking based on the first group of signals and the second group of signals;

determine an adjustment signal for adjusting a suspension system of the vehicle based on signals defining at least one characteristic of the suspension system, in response to the trigger condition being met; and operate the suspension control actuator to adjust the suspension system using the adjustment signal.

10. The suspension control system according to claim 9, wherein the processor is configured to determine if the trigger condition is met by:

obtaining a first parameter from a first parameter table according to an actual acceleration signal of the vehicle, wherein the actual acceleration signal is from the first group of signals, in response to a determination result that the vehicle has begun braking;

set a timing value for a timer according to the first parameter;

obtaining a second parameter from a second parameter table according to a road slope signal, wherein the road slope signal is from the second group of signals; and modifying the timing value according to the second parameter;

wherein the trigger condition is met once the timer starts timing and the timing is up.

11. A vehicle configured to perform the method according to claim 1.

* * * * *